March 15, 1955     C. K. PAUL     2,704,192
AIRCRAFT COMBINING BALLOON AND HELICOPTER
Filed Oct. 4, 1951
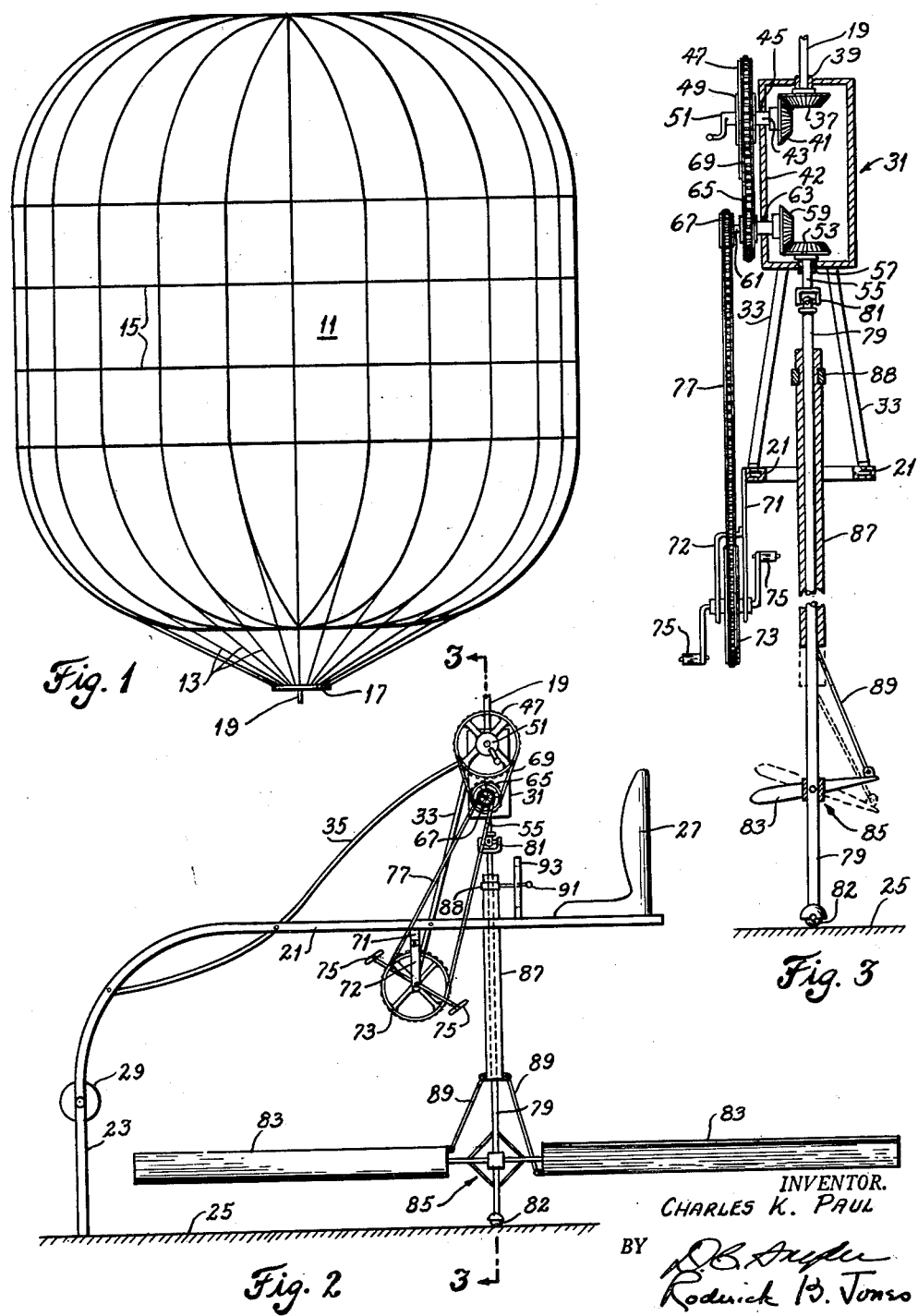
INVENTOR.
CHARLES K. PAUL
BY
ATTORNEYS

2,704,192

AIRCRAFT COMBINING BALLOON AND HELICOPTER

Charles K. Paul, Woodbridge, N. J.

Application October 4, 1951, Serial No. 249,790

7 Claims. (Cl. 244—26)

(Granted under Title 35, U. S. Code (1952), sec. 266)

The invention described herein may be manufactured and used by or for the Government of the United States of America for governmental purposes without the payment of any royalties thereon or therefor.

This invention relates to improvements in aircraft, and more particularly pertains to improvements in buoyant helicopters.

Conventional free or guided balloons are of limited maneuverability and subject to fatal bag failure. Helicopters provide a slow moving type of aircraft adapted for use in rescue and observation work but are relatively expensive to manufacture and maintain, and are subject to descent at a fatal rate in the event of power plant failure even though the windmilling of the blades during a free fall tends to counteract the force of gravity. The subject device affords a unique, inexpensive combination of the salutary characteristics of balloons and helicopters, whereby a readily maneuverable and slow moving aircraft that is inordinately safer than devices heretofore known, and that is capable of being propelled and controlled by human power alone, is provided.

The principal object of this invention is to provide a flying machine that is safer than devices of like general character heretofore employed.

Another object is to provide a flying machine that is relatively inexpensive to manufacture and maintain, readily maneuverable by human power, and adapted for use in rescue and observation work.

Still another object is to provide a flying machine wherein a rotating inflated bag and rotating propellers driven by a common pedal-operated linkage, in association with suitable controls, provides means to sustain flight and to maneuver as desired.

Other objects and many of the attendant advantages of this invention will be readily appreciated as the same becomes better understood by reference to the following detailed description when considered in connection with the accompanying drawing wherein:

Fig. 1 is an elevation of the inflated balloon portion of the device;

Fig. 2 is an elevation, on an enlarged scale, of the body portion of the device; and Fig. 3 is a section taken on the line 3—3 of Fig. 2, on a further enlarged scale, showing details of construction of the device.

Similar numerals refer to similar parts throughout the several views.

The balloon 11 is a prolate spheroid inflated with buoyant gas such as helium. A plurality of shroud lines 13, retained in position by a plurality of spaced latitudinal stringers 15, are equally spaced, encircle said balloon 11, and terminate at a horizontally positioned plate wheel 17, each of said shroud lines 13 being tied or otherwise secured near the periphery of said plate wheel 17 in equally spaced relation. Stub shaft 19 is fixed axially upon said plate wheel so that rotation of said shaft rotates the balloon 11 by means of linking shroud lines 13.

The body portion of the device comprises a frame that includes an elongate structural member 21 having a depending leg portion 23, the tip of leg portion 23 being adapted to contact the ground 25 when the device is parked. Seat 27 is affixed upon the end of member 21 distal said leg portion, and a counterweight 29 is secured to the leg portion 23 to aid in achieving static and dynamic balance relative the axis hereinafter described.

Gear box 31 is secured above structural member 21 by struts 33 and 35. Bevel gear 37 in said gear box is fixed on shaft 19, which extends through a bearing 39 in the top wall of said gear box. Said bevel gear 37 meshes with bevel gear 41, which is fixed on shaft 43, and said shaft 43 extends through a bearing 45 in side wall 42 of gear box 31, as shown in Fig. 3. Sprocket 47 is mounted on shaft 43, external gear box 31, and slip clutch 49 operated by hand wheel 51 is adapted to engage or disengage said sprocket 47 and said shaft 43.

Bevel gear 53 in said gear box is fixed on stub shaft 55, which extends through a bearing 57 in the bottom wall of said gear box. Said bevel gear 53 meshes with bevel gear 59, which is fixed on shaft 61, and said shaft 61 extends through a bearing 63 in the side wall 42 of gear box 31, as shown in Fig. 3. Sprockets 65 and 67 are fixed on said shaft 61, with sprockets 65 and 47 being linked in driving and driven relation respectively by chain 69.

Arm 71 depends from member 21 and carries a bracket 72 in which is mounted sprocket 73, said sprocket 73 being rotatable by means of pedals 75 in the manner of conventional velocipedes. Sprockets 73 and 67 are linked in driving and driven relation respectively by chain 77.

The propeller shaft 79 depends below and is coupled to the shaft 55 through a universal joint 81, said shaft 79 terminating in a ball-bearing caster 82 that permits contact with the ground 25 without rotation when the propeller blades hereinafter described are in motion. Propellers 83 are mounted on shaft 79 by means of a hinged joint 85, whereby said propellers can be rotated on their longitudinal axis to provide desired changes in pitch thereof during maneuver of the device. Control sleeve 87 carried on shaft 79 is coupled to the propellers 83 by hinged push-pull rods or struts 89, so that axial movement of said sleeve 87 relative shaft 79 by means of handle 91, which is fixed to said sleeve 87 by bracket 88 and is limited in vertical and transverse movement by collaring bracket 93 extending from securement upon member 21, is effective to change the pitch of propellers 83.

The means of operation of the device is apparent from the foregoing description of the structure thereof. The operator sits on seat 27 and pedals with his feet, so that sprocket 73, which in turn moves chain 77, rotates sprocket 67. Said sprocket 67 is connected through shaft 61 to bevel gear 59, which rotates shaft 55 through bevel gear 53. In a preferred embodiment of the device, one complete rotation of sprocket 73 results in two complete rotations of shaft 55, and thus two complete rotations of propellers 83.

The universal joint 81 permits the propeller shaft 79 to be rotated and its axis tilted within the limitations prescribed by the position of the legs of the operator, such tilt of the axis providing means to effect lateral motion of the craft. The rods or struts 89, controlled by sleeve 87, are adapted to change the pitch of the propellers 83, so that the operator can drive the craft upward or downward, at varying rates. The drive mechanism operating through gear box 31, whereby, preferably, shaft 19 is rotated at approximately one-fifth of the speed of rotation of shaft 55, provides rotation of balloon 11 in a direction opposite to the direction of rotation of propellers 83, which stabilizes the entire craft and counteracts the torque developed by the propellers 83. Consequently, the operator can remain on a fixed bearing.

Slip clutch 51, hand controlled, permits the operator to allow the balloon 11 to remain free and not rotate, or to rotate said balloon through the linkages described. The frame 21 on which the operator sits is attached to the gear box 31 by means of fixed connections and held level at all times respective a plane normal to the balloon axis, by counter-balancing the operator's weight by the length of the frame and by means of the counterweight 29 fixed on the leg 23.

Propulsion and flight are initiated by adjusting propellers 83 to a position of minimum pitch, and by relieving the slip clutch so that the balloon is in non-rotating relation. When the propellers are revolving at a moderate rate, the operator slides control sleeve 87 downward, thereby increasing the pitch of the propellers 83 and driving the machine upward vertically. The frame then starts to swing in a clockwise direction, due to the torque of the propellers. At that time, the operator adjusts the slip clutch so as to commence rotation of the balloon 11 in a counterclockwise direction, thus counteracting propeller torque. The operator then continues to drive himself upward to the desired elevation, and then controls his course of travel by tipping the shaft 79 hanging on universal joint 81 in a direction opposite to the desired direction of travel, meanwhile controlling the pitch of the propeller 83 to hold himself level with the ground and at the same time develop motion in the desired direction.

The advantages of the craft hereinabove described are apparent. A flying machine controlled completely by human power, and affording optimum safety, is provided. In the case of mechanical failure, the craft will descend gently to the ground. In the case of a balloon failure, the craft can descend gently to the ground by operation of the propellers. In case of both mechanical and balloon failure and complete collapse of the balloon, the balloon will reverse, within the limits of the shroud lines, and the craft will parachute safely to the ground.

Obviously many modifications and variations of the present invention are possible in the light of the above teachings. The revolving propeller blades can be installed immediately upon the balloon, circulating within a large ring supporting the balloon. Twinned balloons mounting ailerons could be employed, with the balloons rotating oppositely. Motor power can be substituted for, or added to, the means of propulsion described. Many other changes in structure are obviously within the ambit of the invention. It is therefore to be understood that within the scope of the appended claims the invention may be practiced otherwise than as specifically described.

I claim:

1. An aircraft comprising a frame member adapted to carry an operator, a spherical balloon carried by said frame member, and means to rotate said balloon on its vertical axis, said means being mounted on said frame member.

2. An aircraft comprising a frame member adapted to carry an operator, a balloon and a propeller carried on substantially vertical axes by said frame member, and means to rotate said balloon and said propeller oppositely on said axes, said means being mounted on said frame member.

3. An aircraft comprising a frame member adapted to carry an operator, a balloon and a propeller carried on substantially vertical axes by said frame member, and means to rotate said balloon and said propeller oppositely simultaneously on said axes, said means being mounted on said frame member.

4. An aircraft comprising a frame member adapted to carry an operator, a balloon and a propeller rotatable on a vertical axis carried by said frame member, means to rotate said balloon and said propeller on their vertical axes oppositely simultaneously at predetermined respective rates, said means being mounted on said frame member, and means to release said balloon from such rotative relation.

5. An aircraft comprising a frame member adapted to carry an operator, a balloon and a propeller rotatable on a vertical axis carried by said frame member, pedal-operated means to rotate said balloon and said propeller on their vertical axes oppositely simultaneously at predetermined respective rates, said means being mounted on said frame member, and means to release said balloon from such rotative relation.

6. An aircraft comprising a frame member adapted to carry an operator, a balloon and a propeller rotatable on a vertical axis carried by said frame member, pedal-operated means to rotate said balloon and said propeller on their vertical axes oppositely simultaneously at predetermined respective rates, said means including a gear box mounted on said frame member, and means to release said balloon from such rotative relation.

7. An aircraft comprising a frame member adapted to carry an operator, a balloon and a propeller rotatable on a vertical axis carried by said frame member, means to vary the pitch of said propeller, means to tilt the axis of said propeller, pedal-operated means to rotate said balloon and said propeller on their vertical axes oppositely simultaneously at predetermined respective rates, said pedal-operated means being mounted on said frame member, and means to release said balloon from such rotative relation.

References Cited in the file of this patent

UNITED STATES PATENTS

| Number | Name | Date |
|---|---|---|
| 106,862 | Oakes | Aug. 30, 1870 |
| 378,364 | Gustafson | Feb. 21, 1888 |
| 801,321 | Jones | Oct. 10, 1905 |
| 916,456 | Laisy | Mar. 30, 1909 |
| 1,505,376 | Close | Aug. 19, 1924 |
| 2,133,283 | Dandini | Oct. 18, 1938 |